(12) United States Patent
Wilwers et al.

(10) Patent No.: US 11,578,770 B2
(45) Date of Patent: Feb. 14, 2023

(54) GUARD PLATE FOR A DISK BRAKE AND DISK BRAKE

(71) Applicant: Ford Global Technologies, LLC, Dearborn, MI (US)

(72) Inventors: Thomas Wilwers, Prum (DE); Marc Oliver Rettig, Cologne (DE); Tomasz Pawel Grabiec, Bergisch Gladbach (DE); Eugen Weber, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 107 days.

(21) Appl. No.: 16/749,049

(22) Filed: Jan. 22, 2020

(65) Prior Publication Data
US 2020/0232530 A1  Jul. 23, 2020

(30) Foreign Application Priority Data
Jan. 22, 2019 (DE) .......................... 102019200742.2

(51) Int. Cl.
| | |
|---|---|
| *F16D 65/00* | (2006.01) |
| *B60T 1/06* | (2006.01) |
| *F16D 55/22* | (2006.01) |
| *F16D 65/847* | (2006.01) |
| *F16D 55/00* | (2006.01) |

(52) U.S. Cl.
CPC .......... *F16D 65/0081* (2013.01); *B60T 1/065* (2013.01); *F16D 55/22* (2013.01); *F16D 65/847* (2013.01); *F16D 2055/0037* (2013.01)

(58) Field of Classification Search
CPC ......... F16D 2055/0037; F16D 65/0081; F16D 65/0031; F16D 65/847
USPC ...................................... 188/218 A; D12/180
See application file for complete search history.

(56) References Cited

U.S. PATENT DOCUMENTS

| | | | | |
|---|---|---|---|---|
| 768,723 | A * | 8/1904 | Behre et al. ......... | B62D 25/186 280/157 |
| 2,404,389 | A * | 7/1946 | Lyon .................... | B60B 7/04 301/37.106 |
| 4,226,308 | A * | 10/1980 | Nishiyama .............. | F16D 55/22 188/218 A |
| 4,817,765 | A * | 4/1989 | Turak ..................... | F16D 51/00 188/218 A |
| 6,340,079 | B1 * | 1/2002 | Perry ..................... | F16D 65/00 188/218 A |
| 8,556,351 | B1 * | 10/2013 | Uhlin ...................... | B60B 7/04 301/37.104 |
| 2008/0120911 | A1 * | 5/2008 | Browne .................. | E05F 1/105 49/352 |
| 2009/0218858 | A1 * | 9/2009 | Lawall .................... | B60N 2/99 297/216.1 |

(Continued)

FOREIGN PATENT DOCUMENTS

| | | | | |
|---|---|---|---|---|
| GB | 174868 A | * | 2/1922 | ............... B60B 7/00 |

*Primary Examiner* — Bradley T King
(74) *Attorney, Agent, or Firm* — Burr & Forman LLP; Lorne Forsythe

(57) ABSTRACT

A guard plate for a disk brake of a vehicle includes a base element having at least one fastening section for arranging the base element in relation to a brake disk of the disk brake and at least one extension element. The at least one extension element may be movable relative to the base element and is configured to be moved and fixed between an initial position and at least one extension position.

20 Claims, 3 Drawing Sheets

(56) References Cited

U.S. PATENT DOCUMENTS

| | | | |
|---|---|---|---|
| 2011/0108379 A1* | 5/2011 | Pahle | F16D 65/00 188/218 XL |
| 2013/0033093 A1* | 2/2013 | Santana | B60B 7/0066 301/37.104 |
| 2016/0025164 A1* | 1/2016 | Watarai | G01K 11/12 188/218 XL |
| 2018/0050753 A1* | 2/2018 | Lee | B62J 13/00 |
| 2018/0094684 A1* | 4/2018 | Kobayashi | F16D 65/0081 |
| 2018/0209499 A1* | 7/2018 | Grabiec | F16D 65/128 |
| 2019/0329834 A1* | 10/2019 | Trimnell | F16D 65/0081 |

* cited by examiner

# GUARD PLATE FOR A DISK BRAKE AND DISK BRAKE

TECHNICAL FIELD

Example embodiments generally relate to vehicle brakes and, more particularly, relate to a disk brake having a guard plate.

BACKGROUND

KR 2008 0053744 A discloses a disk brake having a guard plate. This guard plate is formed by two mutually opposite circular-segment-shaped plates which extend radially with respect to a hub and are provided axially with respect to a brake disk of the disk brake. The two plates are each provided in such a way as to be pivotable with respect to the hub by means of a joint and are controllable by means of a hydraulic cylinder. This hydraulic cylinder is coupled to the hydraulic circuit of the disk brake. In an initial position, the two plates are aligned parallel to the brake disk, and therefore an effective safeguard against contamination is formed. The hydraulic cylinder is operated by the actuation of the brake system, with the result that the two plates are pivoted away from the brake disk.

U.S. Pat. No. 4,005,768 discloses a disk brake having a disk-shaped guard plate, which extends radially with respect to a hub and is arranged parallel to a brake disk of the disk brake. The guard plate has a multiplicity of ventilation holes, wherein a baffle is provided as a dirt collector on the opposite side of the guard plate from the brake disk, said baffle covering the ventilation holes axially.

U.S. Pat. No. 6,578,678 describes a disk-shaped guard plate for a disk brake, which is arranged axially with respect to a brake disk of the disk brake. The guard plate is arranged in a fixed manner with respect to the rotating brake disk, wherein a plurality of radially extending blades is formed on the surface of the disk-shaped guard plate which faces the brake disk.

DE 10 2009 023 104 B4 discloses a brake caliper for a disk brake, which has an assembly opening for the installation and removal of brake pads. To prevent the soiling of the brake pads, a cover plate is provided, by means of which the assembly opening can be closed.

U.S. Pat. No. 4,583,623 describes a heat shield for a hydraulic piston of a brake system. This heat shield is provided on an outer circumference of the hydraulic piston and is arranged between a brake pad of the brake system and a sealing ring of the hydraulic piston.

In view of these and other references that represent the state of the art, guard plates for protecting disk brakes still leave room for improvement.

BRIEF SUMMARY OF SOME EXAMPLES

Some example embodiments may provide a guard plate for a disk brake and a disk brake having a guard plate of this kind which allows protection from contamination and effective cooling of a brake disk.

In accordance with an example embodiment, a guard plate for a disk brake of a vehicle is provided. The guard plate includes a base element having at least one fastening section for arranging the base element in relation to a brake disk of the disk brake and at least one extension element. The at least one extension element may be movable relative to the base element and is configured to be moved and fixed between an initial position and at least one extension position.

In another example embodiment, a disk brake for a vehicle having a brake disk may be provided. The brake disk may include an axle fastening for reception and/or fastening on a wheel axle of the vehicle that can be connected to a vehicle wheel, and a brake caliper may be arranged in relation to the brake disk for reception of brake pads. The disk brake may include a guard plate provided adjacent to the brake disk. The guard plate may include a base element having at least one fastening section for arranging the base element in relation to the brake disk of the disk brake and at least one extension element. The at least one extension element may be movable relative to the base element and is configured to be moved and fixed between an initial position and at least one extension position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
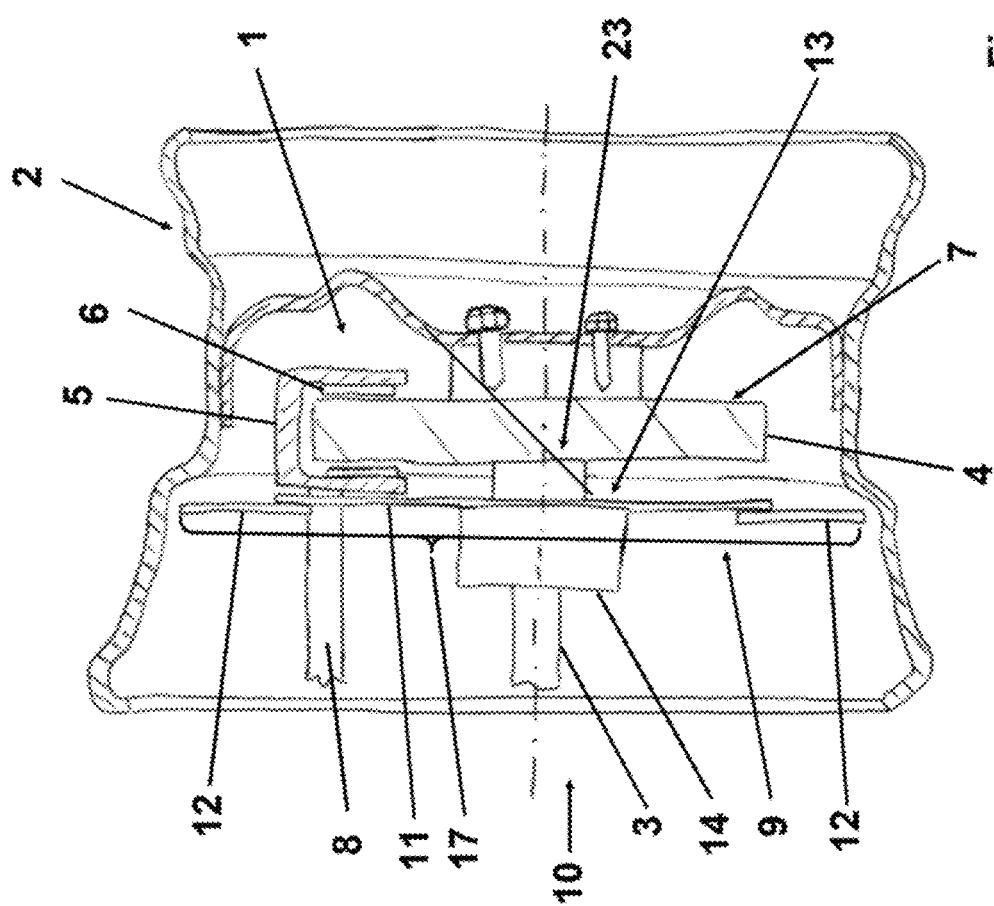
FIG. 1 illustrates a schematic sectional view of a disk brake having a guard plate in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

Some example embodiments described herein may provide for a guard plate for a disk brake of a vehicle, such as a motor vehicle, which has a base element, on which at least one fastening section for arranging the base element in relation to a brake disk of the disk brake is provided. A guard plate of this kind, which may also be referred to as a dust shield, is arranged axially adjacent to the brake disk of the disk brake. As a result, contamination of the disk brake, in particular of the brake disk and brake pads, due to dust, dirty water, salt or other detrimental influences can be reduced during the operation of the vehicle. At least one extension element may be arranged in such a way as to be movable relative to the base element, wherein the at least one extension element can be transferred between an initial position and at least one extension position, and wherein a radial extension of the base element, at least in some section or sections, is provided by the at least one extension element. By this arrangement, at least some region or regions of at least one extension element, e.g., an outer circumference of the guard plate, can be enlarged or reduced in size. In this way, simple adaptation of the guard plate to the brake disk and/or to the vehicle wheel can be made possible in order to prevent contamination. Moreover, optimum flow conditions for cooling the brake disk can be created by the adaptation of a guard plate of this kind to the brake disk and/or to the vehicle wheel. By virtue of this effective cooling of the brake disk, smaller dimensioning of the disk brake can be envisaged, thus enabling the costs for the disk brake of the vehicle to be lowered. The smaller dimensioning of the disk brake can also lead to a reduction in the vehicle mass, in the rotating mass and in the unsprung mass, thereby making it possible, inter alia, to exert a positive influence on the driving dynamics of the vehicle.

Some embodiments of the guard plate envisage that the at least one extension element may be arranged in relation to or on the base element by an adjusting mechanism. Accordingly, a step-less or stepwise adjusting movement of the at least one extension element relative to the base element may be provided by the adjusting mechanism. By means of the adjusting mechanism, a guided adjusting movement of the at least one extension element in relation to the base element can be performed. Since the adjusting mechanism allows a step-less or stepwise adjusting movement, the extension element can be arranged in various positions relative to the base element. Variable adaptation of the size, in particular of the diameter, of the guard plate can thereby be made possible. With the step-less adjusting mechanism, the extension element can be arranged in a specific position by self-locking. With the stepwise adjusting mechanism, a plurality of defined positions can be provided.

Some embodiments of the guard plate also or alternatively envisage that the adjusting mechanism has a plurality of latching positions, by means of which the at least one extension element latches in a releasable but positionally stable manner in the initial position and in the extension position. In some cases, at least one further intermediate position, in which the at least one extension element latches in a releasable but positionally stable manner can be provided. By means of this stepwise adjusting mechanism, a plurality of latching positions can be provided for the at least one extension element. As a result, the at least one extension element can be arranged not only in the initial position and the extension position but in at least one further intermediate position. The respective latching positions of the adjusting mechanism can be matched to defined diameters of brake disks or vehicle wheels. The size of the guard plate can thereby be adjusted to the different diameters of the brake disk or of the vehicle wheel in a simple manner. For example, four latching positions can be provided for the at least one extension element, with the result that the at least one extension element is arranged in the initial position for the installation of a vehicle wheel and can be arranged in the other latching positions for rim dimensions of 16 inches, 17 inches and 18 inches, or 17 inches, 18 inches or 19 inches, etc.

In an example embodiment of the guard plate, provision can be made for the base element to have a substantially circular or circular-segment-shaped main body, and for the at least one extension element to form an outer contour which is arc-shaped, at least in some section or sections. The outer contour of the at least one extension element can be formed so as to correspond to an outer circumference of the brake disk or to an inner circumference of a vehicle wheel. By means of a circular or circular-segment-shaped configuration of the main body, optimum coverage of the brake disk can be provided, thus forming an effective safeguard against contamination. By means of the configuration of the outer contour of the at least one extension element in the form of an arc, at least in some section or sections, it is furthermore possible to make provision for said element to be matched to the outside diameter of the brake disk or to the inside diameter of the vehicle wheel, at least in some region or regions. Particularly in the at least one extension position, the arc-shaped outer contour of the at least one extension element, at least in some section or sections makes it possible to form a small clearance with respect to the vehicle wheel. In this way, a minimum gap can be provided between the at least one extension element or guard plate and the vehicle wheel. An optimum safeguard against contamination may thereby be formed. Moreover, a significant improvement in brake cooling can be achieved by means of the minimum radial clearance between the inside diameter of the vehicle wheel and the at least one extension element or guard plate. In addition, the flow conditions at the vehicle wheel can thereby be optimized, thus enabling the aerodynamics, especially the drag of the vehicle, to be improved.

Some embodiments of the guard plate envisage that a plurality of extension elements may be provided on the base element, in particular along an outer circumference of the base element. A dirt collecting surface extending in a substantially flat manner relative to the brake disk may be formed by the base element and the extension elements, at least in the extension position. Through the provision of a plurality of extension elements on the base element, a radial extension of the base element can be provided over the entire or virtually the entire circumference of the base element. A dirt collecting surface which is as large as possible can thereby be formed by the guard plate.

In one example embodiment of the guard plate, provision can be made for the extension elements to be of segment-shaped, facet-shaped, lamella-shaped and/or fan-shaped design and to be capable of movement between the initial position and the at least one extension position by a translational movement and/or pivoting movement. By means of such an embodiment of the extension elements, it is possible to provide a circular or virtually circular radial extension of the base element, especially in the extension position, preferably also in the at least one intermediate position.

In another example embodiment of the guard plate, provision can be made for the base element and/or the at least one extension element to have a plurality of apertures for ventilating the brake disk of the disk brake. These apertures in the guard plate can be configured in many different ways and can bring about or assist the formation of a cooling air flow for cooling the brake disk. The apertures can be configured in such a way that no dirt can reach the brake disk in spite of the cooling air flow, e.g., as specially designed cooling air ducts or through the provision of a catching device.

Some example embodiments may therefore include a disk brake for a vehicle, such as a motor vehicle, having a brake disk, which has an axle fastening for reception and/or fastening on a wheel axle of the vehicle that can be connected to a vehicle wheel, and having a brake caliper, arranged in relation to the brake disk, for the reception of brake pads. In this context, a guard plate according to any one of the embodiments described above may be provided adjacent to the brake disk. In the case of a disk brake with a guard plate or dust shield of this kind, contaminants and excessive wear or even defects which arise owing to contamination by dust or spray can be prevented or at least reduced. Since the guard plate allows radial extension, a single design of the guard plate can furthermore be used for different brake disk diameters and/or vehicle wheels. It is thereby possible to reduce the production costs of the disk brake.

FIG. 1 shows a schematic sectional view of a disk brake 1 according to an example embodiment. A disk brake 1 of this kind is generally used to brake vehicles, especially motor vehicles, such as passenger cars, heavy goods vehicles or motorcycles, by decelerating the rotary motion of the vehicle wheels 2 by means of friction. In FIG. 1, the vehicle wheel 2 is indicated by a rim of the vehicle wheel 2. For deceleration, the disk brake 1 has a brake disk 4 connected to a wheel axle 3. This is generally of circular design. The brake disk 4 is connected, in particular screwed, to the wheel axle 3 for conjoint rotation therewith by an axle fastening 23.

A brake caliper 5 may be arranged in relation to the brake disk 4. The brake caliper 5 is provided to receive brake pads 6. The brake pads 6 are arranged on both sides of the brake disk 4 and are brought into contact with a friction surface 7 of the brake disk 4 to generate the necessary braking friction during a braking process. The brake pads 6 can be controlled by a hydraulic system 8.

During the operation of the vehicle, the disk brake 1 can be contaminated by dust and spray, as a result of which excessive wear or even defects can occur owing to the dust, dirt or salt deposited on the brake disk 4 and the brake pads 6. In order to prevent or at least minimize such contamination, a guard plate 9 is provided. This guard plate 9 is arranged adjacent to the brake disk 4. A dirt collecting surface 17 for the disk brake 1 and/or brake disk 4 is formed by the guard plate 9, at least in some region or regions. In some cases, the guard plate 9 may be arranged on an inner side 10 of the brake disk 4, which may be the inner side facing the vehicle.

The guard plate 9 has a base element 11, on which a plurality of extension elements 12 is arranged. The base element 11 is attached, preferably screwed, to a support 14 by means of a fastening section 13 in a manner fixed with respect to the brake disk 4.

Figure 2:
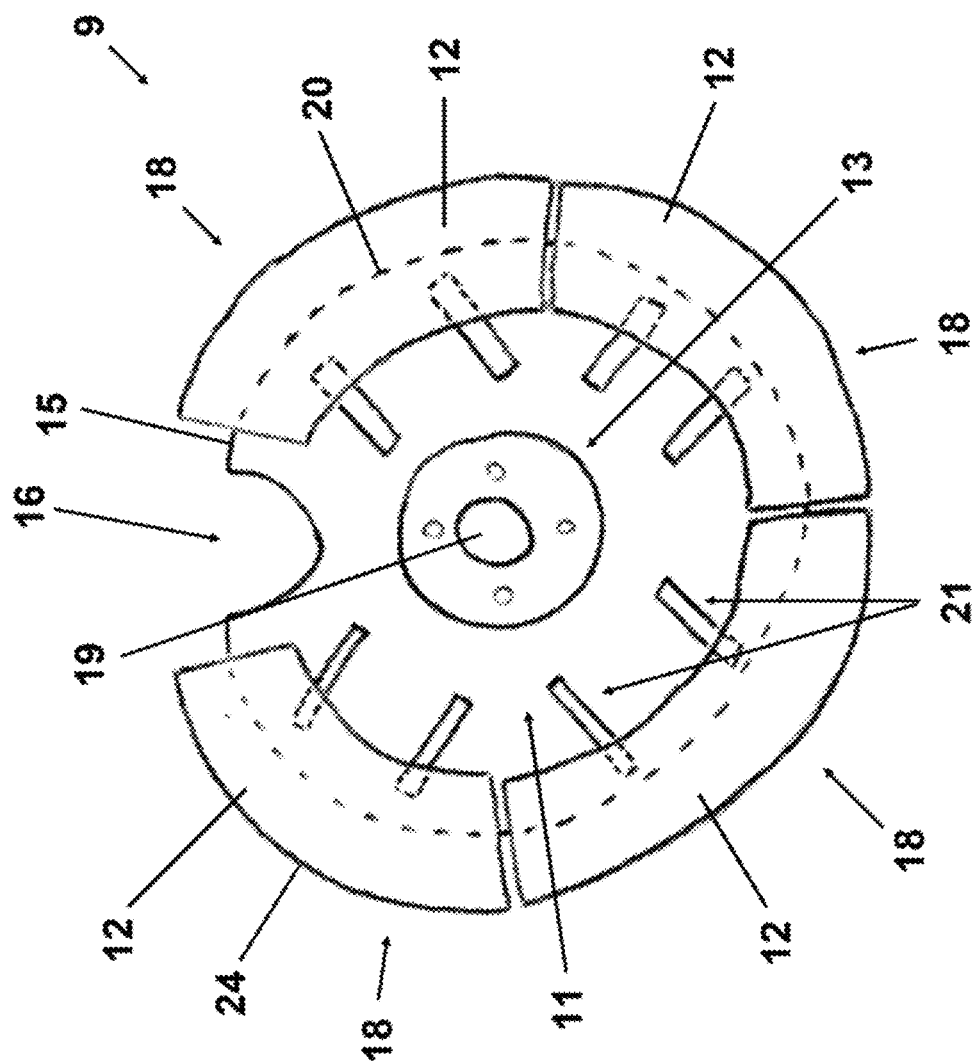
FIG. 2 illustrates a schematic plan view of the guard plate according to FIG. 1 in an extension position in accordance with an example embodiment.

A schematic plan view of the guard plate 9 according to the invention is illustrated in FIG. 2. In this illustration, the extension elements 12 on the base element 11 are arranged in an extension position 18. The base element 11 has a substantially circular main body 15. A recess 16 for the brake caliper 5 can be provided in the base element 11. As a result, the guard plate 9 or base element 11 can be arranged with a minimum clearance with respect to the brake disk 4. Moreover, the base element 11 can have an aperture 19 for a wheel axle 3 of the vehicle.

In an alternative embodiment, the base element 11 can also be of circular-segment-shaped design. It is thereby possible to form a guard plate 9, by means of which the brake disk 4 is covered by the base element 11 only in this circular-segment-shaped region, e.g., only in the region of the brake caliper 5.

The extension elements 12 extend in a flat manner relative to the base element 11 and are of segment-shaped configuration. The extension elements 12 have an arc-shaped outer contour 24. The extension elements 12 are arranged adjacent to one another along an outer circumference 20 of the base element 11. In the extension position 18, the arc-shaped outer contour 24 of the segment-shaped extension elements 12 forms a surface in the form of a circular ring, which is formed adjacent to the outer circumference 20 of the base element 11. In the extension position 18, the extension elements 12 can be arranged either directly adjoining one another or at least partially overlapping in the lateral regions of said elements.

Each of the extension elements may be arranged by means of an adjusting mechanism 21 on the base element 11. This adjusting mechanism 21 makes it possible to perform an adjusting movement of the extension element 12 relative to the base element 11. The adjusting mechanism 21 preferably brings about a radial translational movement of the extension elements 12. Each of the extension elements 12 can thereby be moved between the extension position 18 illustrated in FIG. 2 and an initial position 22 illustrated in FIG. 3. By means of the adjusting mechanism 21, it is possible to achieve either a step-less or, alternatively, a stepwise adjusting movement of the extension elements 12. As a result, it is also possible to provide one or more intermediate positions for the extension elements 12. In the case of the stepwise adjusting movement, the adjusting mechanism 21 can have a plurality of latching positions, in which the extension element 12 latches in a releasable manner.

Figure 3:
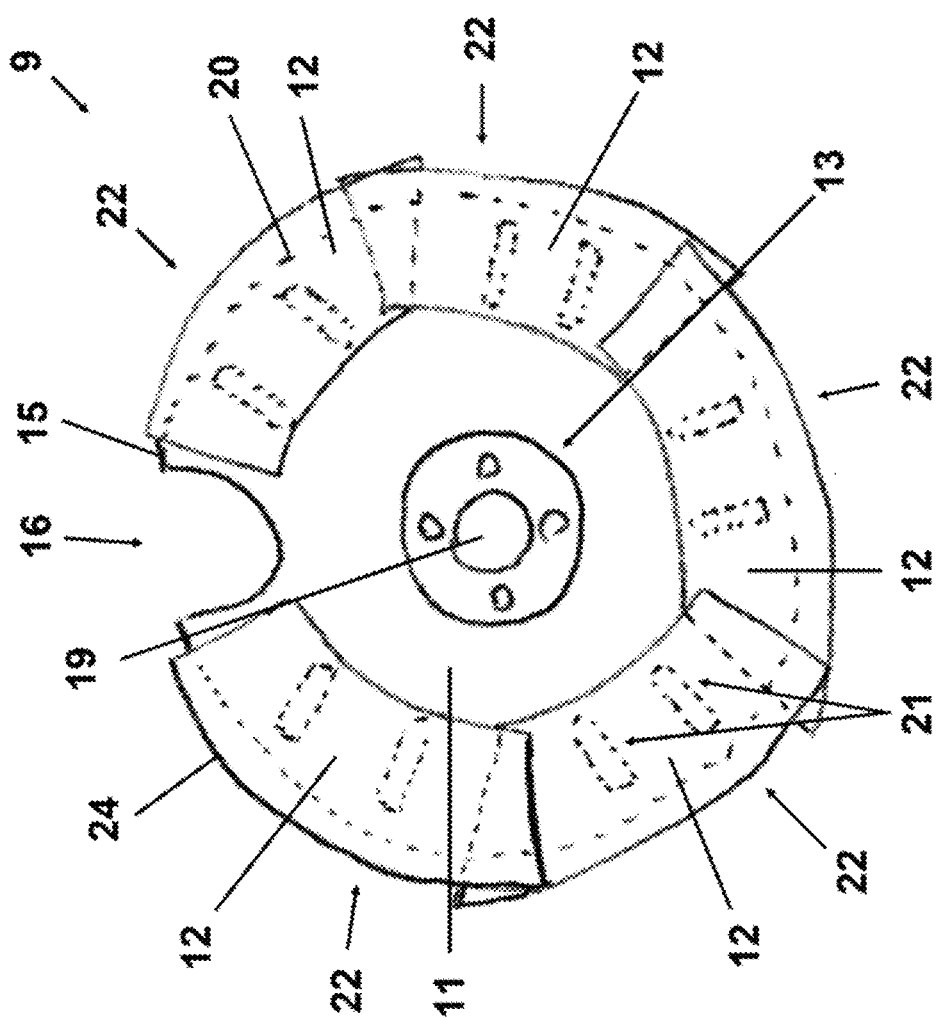
FIG. 3 illustrates a schematic plan view of the guard plate according to FIG. 1 in an initial position in accordance with an example embodiment.

According to FIG. 2, each adjusting mechanism 21 may be formed by two guides. It is likewise also possible for the adjusting mechanism 21 to be formed by just one guide. Such a guide can be designed as a sliding guide, e.g., as a slide guide, dovetail guide or comparable guide, for example. The adjusting mechanism 21 can be provided either as a linear guide (as shown in FIGS. 2 and 3) or as a curved guide. By means of a curved guide, the adjusting movement of the extension element 12 can also be embodied as a pivoting movement, for example.

As an alternative, any other embodiment of an adjusting mechanism which allows a translational movement and/or pivoting movement of the extension elements 12 can also be provided. It is also possible, for example, for the extension elements 12 to be formed by a multiplicity of facet-shaped, lamella-shaped or fan-shaped elements. For these, it is possible to provide an adjusting mechanism 21 which allows a translational movement or a pivoting movement or a combination thereof out of the initial position 22 into the extension position 18.

FIG. 3 shows the extension elements 12 in the initial position 22. This illustration makes clear that the extension elements 12 partially overlap in the initial position 22. This overlap results from the fact that the extension elements 12 form a radial extension of the base element 11 in the extension position 18. In this case, the extension elements 12 are arranged adjoining one another and form a circular ring, which has a larger diameter than the outside diameter of the base element 11. When the extension elements 12 are moved out of this extension position 18 in the direction of the base element 11, this overlap is required for reasons of space in order to accommodate the extension elements 12 on the base element 11 in the initial position 22.

Thus, according to an example embodiment, a guard plate for a disk brake of a vehicle may be provided. The guard plate includes a base element having at least one fastening section for arranging the base element in relation to a brake disk of the disk brake and at least one extension element. The at least one extension element may be movable relative to the base element and is configured to be moved and fixed between an initial position and at least one extension position.

The guard plate of some embodiments may include additional features, modifications, augmentations and/or the like to achieve further objectives or enhance durability of the guard plate. Similarly, a disk brake comprising the guard plate described above may include additional features, modifications, augmentations and/or the like. The additional features, modifications, augmentations and/or the like may be added in any combination with each other. Below is a list of various additional features, modifications, and augmentations that can each be added individually or in any combination with each other. For example, the at least one extension element may be arranged in relation to or on the base element by an adjusting mechanism. The adjusting mechanism may be configured to enable a step-less or stepwise adjusting movement of the at least one extension element relative to the base element. In an example embodiment, the adjusting mechanism may have a plurality of latching positions, via which the at least one extension element latches in a releasable but positionally stable manner in the initial position and in the extension position. In some cases, one of the latching positions may be an intermediate position between the initial position and the extension position. In an example embodiment, the base element may have a substantially circular or circular-segment-shaped main body, and the at least one extension element may form an outer contour that is arc-shaped, at least in some section or sections. In some cases, the outer contour corresponds to an outer circumference of the brake disk or to an inner circumference of a vehicle wheel. In an example embodiment, a plurality of extension elements may be provided on the base element, and a dirt collecting surface extending in a substantially flat manner relative to the brake disk may be formed by the base element and the extension elements, at least in the extension position. In some cases, the plurality of extension elements may be provided along an outer circumference of the base element. In an example embodiment, the extension elements may be segment-shaped, facet-shaped, lamella-shaped and/or of a fan-shaped design, and the extension elements are movable between the initial position and the at least one extension position by a translational movement and/or pivoting movement. In some cases, the base element and/or the at least one extension element may include a plurality of apertures for ventilating the brake disk of the disk brake.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A guard plate for a disk brake of a vehicle, the guard plate comprising:
    a base element comprising a fastening section that affixes the base element on an inner, wheel axle side of the brake disk, the base element further comprising an aperture for receiving a wheel axle of the vehicle;
    a plurality of extension elements; and
    a plurality of adjusting mechanisms, each adjusting mechanism of the plurality of adjusting mechanisms comprising a plurality of linear sliding guides that movably couple each extension element of the plurality of extension elements to the base element;
    wherein each extension element of the plurality of extension elements is linearly and radially movable in a direction away from an axis of rotation of the brake disk via the plurality of linear sliding guides and each extension element of the plurality of extension elements is fixable at an extension position;
    wherein, with the plurality of the extension elements in the extension position, the plurality of extension elements form a gap between two of the extension elements within the plurality of extension elements that is aligned with a recess in the base element for receiving a portion of a hydraulic system for a brake caliper.

2. The guard plate of claim 1, wherein each extension element of the plurality of extension elements are is arranged in relation to or on the base element by one of the adjusting mechanisms of the plurality of adjustment mechanisms, and
    wherein each adjusting mechanism of the plurality of adjusting mechanisms is configured to enable a stepless or stepwise adjusting movement of one of the extension elements relative to the base element.

3. The guard plate of claim 1, wherein each adjusting mechanism of the plurality of adjusting mechanisms has a plurality of latching positions via which a respective extension elements of the plurality of extension elements latches in a releasable but positionally stable manner in an initial position and in the extension position.

4. The guard plate of claim 1, wherein the base element has a substantially circular or circular-segment-shaped main body, and the plurality of extension elements forms an outer contour that is arc-shaped, at least in one or more sections.

5. The guard plate of claim 4, wherein the arc-shaped one or more sections of the outer contour have substantially a same arc-shape as an outer circumference of the brake disk or an inner circumference of a vehicle wheel.

6. The guard plate of claim 1
    wherein a dirt collecting surface extending in a substantially flat manner relative to the brake disk is formed by the base element and the plurality of extension elements being in the extension position.

7. The guard plate of claim 6, wherein the plurality of extension elements is provided along an outer circumference of the base element, wherein the plurality of extension elements comprise a first extension element;

wherein the plurality of linear sliding guides comprise a first sliding guide and a second sliding guide;

wherein the first extension element comprises the first sliding guide, and the first sliding guide couples the first extension element to the base element;

wherein the first extension element comprises the second sliding guide, and the second sliding guide couples the first extension element to the base element;

wherein the first sliding guide and the second sliding guide linearly translate to cause the movement of the plurality of extension elements relative to the base element.

8. The guard plate of claim 1, wherein each of the extension elements within the plurality of extension elements is circular segment-shaped.

9. The guard plate of claim 1, wherein the base element and/or the plurality of extension elements include a plurality of apertures for ventilating the brake disk of the disk brake.

10. The guard plate of claim 1, wherein the base element comprises a central aperture for receiving a wheel axle through the central aperture.

11. The guard plate of claim 1, wherein the guard plate is disposed within an inner, wheel-axle side cavity of a wheel and the plurality of extension elements extend toward an inner wall of the inner, wheel-axle side cavity of the wheel.

12. The guard plate of claim 1, wherein, with the plurality of the extension elements in the extended position, the guard plate has a substantially continuous arc-shaped outer contour over greater than three quarters of a circular shape.

13. A disk brake for a vehicle, the disk brake comprising:
a brake disk;
an axle fastening for reception and fastening of the brake disk on a wheel axle of the vehicle;
a brake caliper arranged in relation to the brake disk for reception of brake pads, the brake caliper being configured to be operably coupled to a hydraulic system to operate the brake caliper; and
a guard plate provided adjacent to the brake disk, the guard plate comprising:
a base element comprising a fastening section that affixes the base element on an inner, wheel axle side of the brake disk, the base element further comprising an aperture for receiving a wheel axle of the vehicle;
a plurality of extension elements; and
a plurality of adjusting mechanisms, each adjusting mechanism of the plurality of adjusting mechanisms comprising a plurality of linear sliding guides that movably couple each extension element of the plurality of extension elements to the base element;
wherein each extension element of the plurality of extension elements is linearly and radially movable in a direction away from an axis of rotation of the brake disk via the plurality of linear sliding guides and each extension element of the plurality of extension elements is fixable at an extension position;
wherein, with the plurality of the extension elements in the extension position, the plurality of extension elements form a gap between two of the extension elements within the plurality of extension elements that is aligned with a recess in the base element for receiving a portion of the hydraulic system for the brake caliper.

14. The disk brake of claim 13, wherein each extension element of the plurality of extension elements is arranged in relation to or on the base element by one of the adjusting mechanisms of the plurality of adjusting mechanisms, and
wherein each adjusting mechanism of the plurality of adjusting mechanisms is configured to enable a stepless or stepwise adjusting movement of one of the extension elements relative to the base element.

15. The disk brake of claim 13, wherein each adjusting mechanism of the plurality of adjusting mechanisms has a plurality of latching positions via which a respective extension elements of the plurality of extension elements latches in a releasable but positionally stable manner in an initial position and in the extension position.

16. The disk brake of claim 15, wherein one of the latching positions is an intermediate position between the initial position and the extension position.

17. The disk brake of claim 13, wherein the base element has a substantially circular or circular-segment-shaped main body, and the plurality of extension elements form an outer contour that is arc-shaped, at least in one or more sections.

18. The disk brake of claim 17, wherein the arc-shaped one or more sections of the outer contour have substantially a same arc-shape as an outer circumference of the brake disk or an inner circumference of a vehicle wheel.

19. The disk brake of claim 13,
wherein a dirt collecting surface extending in a substantially flat manner relative to the brake disk is formed by the base element and the plurality of extension elements being in the extension position.

20. The disk brake of claim 19, wherein the plurality of extension elements is provided along an outer circumference of the base element, wherein the plurality of extension elements comprise a first extension element;
wherein the plurality of linear sliding guides comprise a first sliding guide and a second sliding guide;
wherein the first extension element comprises the first sliding guide, and the first sliding guide couples the first extension element to the base element;
wherein the first extension element comprises the second sliding guide, and the second sliding guide couples the first extension element to the base element;
wherein the first sliding guide and the second sliding guide linearly translate to cause the movement of the first extension element relative to the base element.

* * * * *

UNITED STATES PATENT AND TRADEMARK OFFICE
CERTIFICATE OF CORRECTION

| | |
|---|---|
| PATENT NO. | : 11,578,770 B2 |
| APPLICATION NO. | : 16/749049 |
| DATED | : February 14, 2023 |
| INVENTOR(S) | : Thomas Wilwers et al. |

It is certified that error appears in the above-identified patent and that said Letters Patent is hereby corrected as shown below:

In the Claims

In Column 8, Claim 2, Line 37, "plurality of extension elements are is" should read --plurality of extension elements is--

In Column 8, Claim 3, Lines 47-48, "a respective extension elements" should read --a respective extension element--

In Column 10, Claim 15, Lines 20-21, "a respective extension elements" should read --a respective extension element--

Signed and Sealed this
Eighteenth Day of April, 2023

*Katherine Kelly Vidal*

Katherine Kelly Vidal
*Director of the United States Patent and Trademark Office*